United States Patent [19]
Fetterman et al.

[11] Patent Number: 5,400,117
[45] Date of Patent: Mar. 21, 1995

[54] FILM CLAMP FOR FLATTENING IMAGE FRAMES IN A SCANNING GATE

[75] Inventors: Clyde L. Fetterman, Webster; Donald F. Grube, Rochester, both of N.Y.

[73] Assignee: Eastman Kodak Company, Rochester, N.Y.

[21] Appl. No.: 167,643

[22] Filed: Dec. 14, 1993

[51] Int. Cl.$^6$ .............................................. G03B 27/62
[52] U.S. Cl. ......................................... 355/75; 348/96
[58] Field of Search ........................ 355/75, 76; 348/96

[56] References Cited

U.S. PATENT DOCUMENTS

| | | | |
|---|---|---|---|
| 2,199,305 | 4/1940 | Dewey | 355/75 |
| 2,251,184 | 7/1941 | Bohannon | 355/75 |
| 3,288,027 | 11/1966 | Ruzika | 88/24 |
| 3,488,120 | 1/1970 | Nagel | 355/75 |
| 3,542,471 | 11/1970 | Dubay | 355/75 |
| 3,779,643 | 12/1973 | Nosco et al. | 355/75 |
| 4,181,428 | 1/1980 | Proulx | 355/75 |
| 4,241,993 | 12/1980 | Guillaume | 355/75 |
| 4,353,645 | 10/1982 | Kogane et al. | 355/75 |
| 4,835,555 | 5/1989 | Maxwell | 352/194 |
| 4,924,258 | 5/1990 | Tsutsui | 355/53 |
| 4,965,632 | 10/1990 | Jadrich et al. | 355/76 |
| 5,028,956 | 7/1991 | VanScooter | 355/72 |
| 5,055,874 | 10/1991 | Kralles et al. | 355/76 |
| 5,111,241 | 5/1992 | Kralles | 355/75 |
| 5,258,807 | 11/1993 | Reinke | 355/76 |

*Primary Examiner*—Michael L. Gellner
*Assistant Examiner*—Daniel P. Malley
*Attorney, Agent, or Firm*—David M. Woods

[57] ABSTRACT

A film flattening apparatus and method of operation for flattening a filmstrip image frame against an aperture in a base operable by applying normal compressing force through longitudinally extending clamping elements to compress the longitudinal edges of said filmstrip image frame against said base surface, applying transversely directed tensioning force through the longitudinally extending clamping elements away from the image frame to press the longitudinal edges of said filmstrip image frame apart, and applying normal compressing force through laterally extending clamping elements to compress the lateral edges of said filmstrip image frame against the base surface, whereby the filmstrip image frame is flattened by pressing contact along with the longitudinal and transverse edges of the filmstrip image frame and tensioned flat by the laterally applied force as the clamping elements are advanced fully into their respective contact positions. The flattening apparatus is formed of longitudinally and laterally extending clamping members supported on a movable carrier apart from the base in a retracted position during filmstrip advance moved toward the base to a contact position pressing against the longitudinal and transverse edges of the filmstrip image frame. The longitudinally extending clamping elements are pivotally supported on the carrier and biased toward the base for vertical and lateral movement on contact with the filmstrip. The laterally extending clamping elements are biased toward the base for vertical movement on contact with the filmstrip.

14 Claims, 6 Drawing Sheets

FILM CLAMP FOR FLATTENING IMAGE FRAMES IN A SCANNING GATE

CROSS REFERENCE TO RELATED APPLICATION

Reference is made to U.S. patent application Ser. No. 166,769 filed on even date herewith and entitled "Photographic Film Segment Flattening Apparatus", U.S. patent application Ser. No. 906,635 filed on Jun. 30, 1992, and entitled "Multiformat Film Clamp" and U.S. patent application Ser. No. 074,894 filed on Jun. 10, 1993, and entitled "Improved Multiformat Film Clamp".

1. Field of the Invention

The present invention relates to a film clamp for flattening image frames of a filmstrip to facilitate accurate scanning of the image.

2. Background of the Invention

Photographic film is typically formed of a film base having photo sensitive emulsion layers coated on one side in which an image may be captured, typically in a camera. When cut into an elongated filmstrip, the film has a natural tendency to cuff back on itself in both the elongated, axial direction and the width or transverse direction to a degree depending on the film base and the filmstrip dimensions. The filmstrip is typically packaged tightly wound in a cartridge and partially unwound within the camera for making exposures. The cartridge and filmstrip may be stored period of time and under varying conditions of temperature and humidity such that the filmstrip takes on an accentuated "core set" film curl. Film curl is evident in elongated negative filmstrips after processing prior to making prints and also in the shorter segments that negative filmstrips are cut into after photofinishing to fit the segments into an envelope with the customer ordered prints.

Automated photographic printers for making positive paper prints from image frames of processed negative filmstrips are well known in the photographic art. Most automated printers have a film transport mechanism for step-wise advancing the filmstrip an image frame at a time from a supply reel to a takeup reel or the like and through an image frame sized scanning gate and an exposure gate at a high speed. In the scanning gate, the density and color balance of the negative may be automatically read out, and exposure parameters may be calculated and stored in memory until the same image frame is advanced into the exposure gate. In both the momentary scanning and exposure operation, it is highly desirable that the image frame be held down flat and then released for high speed advancement of the next frame.

Various types of transport systems for advancing the filmstrip into and clamping arrangements for momentarily holding flat the image frame in the scanning and exposure gates are disclosed in commonly assigned U.S. Pat. Nos. 5,111,241 and 5,055,874 and in other patents and literature. In the '241 patent, a Bernoulli effect is employed to provide an air bearing to minimize contact and drag during advancement of the filmstrip across a linear array scanning gate. In the '874 patent, film flatteners contact and hold down the lateral sprocket hole edges of the filmstrip image frame in the exposure gate and are raised during filmstrip advancement to the next image frame. The filmstrip is deflected in a serpentine path before and after the aperture of the exposure gate by deflectors that also only contact the sprocket hole edges in order to overcome the tendency of the filmstrip to curl transversely.

In U.S. Pat. No. 4,353,645, a film advancement and flattening apparatus for continuously connected or individual short filmstrip segments is disclosed. A rectangular flattening frame having longitudinal and transverse frame members is attached to a solenoid operated, side mounted, hinged rocker. On operation of the solenoid rocker, the frame is lifted on the side mounted, hinged rocker during filmstrip advancement and rocked downward to engage the sides of the image frame against the stationary frame surrounding the exposure aperture. The side mounting and rocking motion presents the lower side of the transverse edges of the movable transverse frame members in an interfering position with upwardly bowed or curled filmstrip segments, resulting in stubbing of the leading end thereof. To alleviate this problem, it is suggested that the interior edges of the movable transverse frame members be curved, rather than straight.

In a further prior art system employed with automatic printers manufactured by the assignee, film flattening in the exposure gate was effected by movable "picture frame" members positioned above and below the filmstrip which were moved apart to a rest position during filmstrip advancement and clamped together to hold the image frame flat. The movable frame members have upstream and downstream, upper and lower, transverse clamping members. Stubbing of the leading ends of filmstrip segments advanced by the web is avoided by widening the rest position of the transverse clamping members. Doing so increases the path of travel and the time taken, which slows the overall transport speed and hourly printing rate of the printer. Scratching of the filmstrip image frame could also occur during transport to the next image frame.

FIGS. 1 and 2 illustrate the effects such a picture frame film clamp wherein a filmstrip 1 is clamped by clamping force 7 applied normally to the transverse or lateral and the longitudinal image frame edges to compress it against the like edges of the aperture 5 in the base 3. In use of such a clamp, the natural film curl will be retained at least to a perceptible degree in certain contexts, despite the effort to hold it perfectly flat.

In such a further context, it is known to flatten and position image frames of filmstrips with respect to an aperture and frame in order to scan the frames to digitize and record the digitized information for reproduction in a video format. For example, photographic image frames are scanned and the image data derived from the scanning is transformed into a video bit stream employed in the recording of a compact video disc for "photo-CD" playback. Such filmstrip image frame flatteners are described in the above referenced '635 application and the commonly assigned U.S. Pat. Nos. 4,965,632 and 5,028,956.

In such filmstrip flatteners, image frames are stretched or tensioned laterally as a line contact gripping member is brought to bear along and upon the distal longitudinal image frame edge by a solenoid and bell crank mechanism which initiates contact first on the proximal image frame edge and then on the distal image frame edge. The line contact gripping members of the '632 patent are a pair of rollers, whereas a drive belt is substituted for the proximal line contact roller in the '956 patent. The filmstrip is placed under lateral tension as the distal roller is brought to bear on the distal longitudinal edge and extended laterally as the lever slightly flattens resilient arms connecting the line contact gripping members.

FIGS. 3 and 4 are free body and cross section diagrams of the filmstrip 1 image frame held flat against the edges of the aperture 5 through the application of the normal force F, on one longitudinal edge of filmstrip 1 and the combined normal and lateral tensioning force $F_2$ on the opposite longitudinal edge. The characteristics of these forces of FIGS. 1-4 are explained further in the '632 and '956 patents, incorporated herein by reference.

In such flattening apparatus, it is difficult to maintain alignment of the line contact gripping members to maintain constant tensioning and resulting lateral flatness because the resilient arms fatigue and change shape over extended use. The solenoid applies force to the bell crank at a highly accelerated rate with maximum force applied at the end of the solenoid stroke. The high rate of acceleration and applied force has a tendency to cause fatigue failures to occur in the resilient arms and can cause the gripping members to bounce and lose contact with the filmstrip unless tight tolerances are maintained to ensure that the end stroke maximum force is correlated to the contact and lateral movement of the distal gripping member. As tolerances either change with usage or accumulate at manufacture, variations in the amount and timing of the application of force to the film through the stroke of the solenoid and rocker motion of the bell crank are introduced and are difficult to correct.

Moreover, no control is exerted over the leading and trailing edges of excessively curled filmstrips by the film clamping apparatus disclosed in the '632 and '956 patents. In this regard, the leading and trailing edges of the first image frames of a curled filmstrip make it particularly difficult to flatten those frames with the apparatus disclosed in the '632 and '956 patents.

In the above referenced '635 and '894 applications, shaped, compliant material strips are employed as longitudinally and laterally extending clamping elements in a picture frame type mechanism for applying normal force to the image frame edges in the manner depicted in FIGS. 5 and 6. In FIG. 6, all edges of the filmstrip image frame are under the same, normal, clamping force $F_2 \sin \theta$ and the same laterally directed stretching or tensioning force $F_2 \cos \theta$. The force resistive to the motion of the filmstrip at all edges thereof is $\mu F_2 \sin \theta$, where $\mu$ is the coefficient of friction between the surfaces of the filmstrip and the aperture base or platen. To function properly, the following relation must be maintained:

$$F_2 \cos \theta > \mu F_2 \sin \theta$$

In the approaches of the '635 and '894 applications, the shape and resilience of the material used for the clamping elements is relied on to provide some laterally extending force when it is deformed under high normal force. The normal and lateral force vector $F_2$ is achieved on buckling of the side walls of the shaped clamping elements.

This approach is dependent on material selection, and it is difficult to achieve consistent and correct forces at the film/platen interface.

SUMMARY OF THE INVENTION

It is therefor a principal object of the invention to provide a rapidly actuatable film flattening clamp with low dynamic stress which provides a consistent force to the filmstrip regardless of manufacturing tolerances and usage introduced drift in tolerances so that accurate flattening of the image frame is consistently achieved.

It is a further object of the invention to efficiently flatten film image frames in a very flat, uniform plane with respect to a scanning aperture.

It is a still further object of the invention to flatten a filmstrip image frame therein through low acceleration and short path of travel movement of film flattening longitudinal and lateral components which flatten the filmstrip image frames despite upward or downward curvature of the filmstrips.

These and other objects of the invention are met, in accordance with a first aspect of the invention, by an apparatus, and method of operation thereof, operable in a contact position for clamping and flattening a filmstrip image frame with respect to a fixed aperture in a base or platen and in a retracted position for unclamping and allowing rapid transport of filmstrips evidencing transversely extending film curl past the fixed aperture by a filmstrip transport mechanism and for applying a uniform lateral tensioning force on the filmstrip longitudinal edges and for flattening the image frame leading and trailing lateral edges in the clamped position.

Preferably, the method of the invention for clamping the longitudinal and transverse or lateral edges of a filmstrip image frame with respect to the fixed aperture comprises the steps of, in the transport mode, positioning a filmstrip image frame in relation to the fixed aperture, and, in the flattening mode, compressing the longitudinal edges of the filmstrip image frame against the longitudinal edge surfaces of the base, tensioning the longitudinal edges of the filmstrip image frame apart, and compressing the lateral edges of the filmstrip image frame against the lateral edge surfaces of the base, whereby the filmstrip image frame is flattened by pressing contact along the longitudinal and transverse edges and tensioned flat between the longitudinal edges of the filmstrip image frame.

In accordance with a preferred embodiment of the invention, the fixed aperture is formed in a flat surface of the base or platen and bounded by opposed transverse or lateral and longitudinal opening edges dimensioned to allow scanning of the filmstrip image frame and defining lateral and longitudinal edge surfaces adjacent to the respective edges. A movable carrier supports a pair of longitudinally extending clamping elements spaced apart in relation to the longitudinal opening edges of the aperture and a pair of transversely or laterally extending clamping elements spaced apart in relation to the lateral or transverse opening edges of the aperture. A prime mover moves the carrier from a retracted position spaced apart from the base during transport of the filmstrip to a contact position, wherein the pair of longitudinally extending clamping elements make normal, compressing and lateral, tensioning or stretching contact with the longitudinal edges of the filmstrip image frame against the longitudinal edge surfaces of the base to laterally stretch or tension the filmstrip image frame, and wherein the transversely extending clamping elements make compressing contact with the lateral edges of the filmstrip image frame and compress the lateral edges against the lateral edge surfaces of the base. The pair of longitudinally extending clamping elements are supported to extend from the carder toward the base by support arms which each are biased to support one of the longitudinally extending clamping elements along a free end thereof and are pivotally attached at the other end thereof to the movable carrier, so that movement of the carrier into the contact position provides normal and lateral movement to the longitudinally extending clamping elements against the longitudinal edges of the filmstrip image frame as the biased support arms pivot toward the carrier and laterally outward. The pair of laterally extending clamping elements are supported to extend from the carrier toward the base by guides which are each biased to support one of the laterally extending clamping elements so that movement of the carrier into the contact position moves the laterally extending clamping elements against the transverse edges of the filmstrip image frame at the same time that the support arms for the longitudinally extending clamping elements pivot toward the carrier and laterally outward.

Preferably the longitudinally extending clamping elements are elongated rod shaped elements formed of compliant material having high coefficient of friction surfaces for frictional engagement with the longitudinal edges of the image frame for transferring lateral tensioning forces thereto.

The carrier is mounted in a frame for up and down movement from the retracted position to the contact position, respectively, with respect to the base. The carrier is moved up and down at a low rate of acceleration through a motor driven eccentric lifter assembly which bears against the carrier to lift and move it from the retracted to the contact position and lower it back to the retracted position over one rotation of the lifter. During movement of the lifter to the contact position, contact of the longitudinally and laterally extending clamping elements is initially made with the respective image frame edges and tensioning and/or compression forces are applied and increase until the resistance to the applied forces overcomes the motor drive for the lifter assembly and further lifting movement is halted. After scanning is completed, the motor is activated again to drop the lifter assembly and the carrier back down to the retracted position.

The base is preferably removably attached to the frame for ease of cleaning or replacement.

The invention thus advantageously allows excessively curled filmstrips to be transported into and across the scanning aperture while the carrier is in the retracted position without stubbing the leading end of the filmstrip. The invention has particular application to the flattening for scanning of the typically curled leading and trailing image frames of short filmstrip segments as well as the less curled intermediate image frames. The invention also diminishes the likelihood of transport malfunctions occasioned by excessively curled filmstrips entering the scanning gate.

In addition, the arrangement of the biased, pivoting support arms and the biased guides for the longitudinally and laterally extending clamping elements virtually eliminates contact bounce and component fatigue and allows wider tolerances during initial manufacture and tolerates drift occurring in use. The spring biasing force is readily adjusted to the path of travel of the carrier and is relatively constant over time. The dynamic forces applied to moving parts are quite low, such that the induced stresses in the parts are in the range of hundreds of pounds per square inch. These stresses are lower than the induced stresses in the parts in earlier film clamps described above by orders of magnitude, yet film flatness of $< \pm 0.003$ inches over the standard 35 mm image frame for even severely curled filmstrips has been attained with the film clamp of the invention.

BRIEF DESCRIPTION OF THE DRAWINGS

Other objects, advantages and features of the present invention will become apparent from the following specification when taken in conjunction with the accompanying drawings in which like elements are commonly enumerated and in which.

The drawings are not necessarily to scale.

DETAILED DESCRIPTION OF THE PREFERRED EMBODIMENTS

Figure 1:
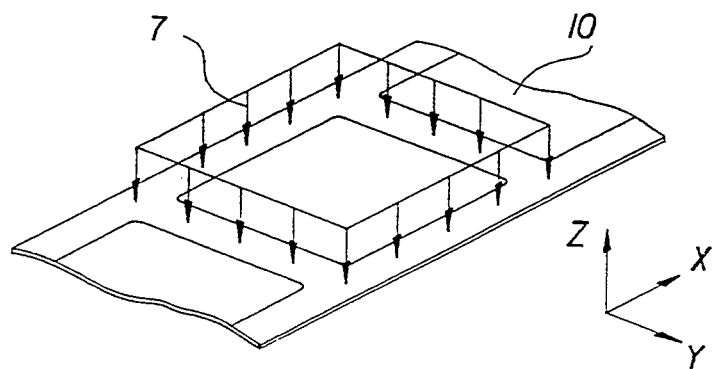
FIG. 1 is a free body diagram which illustrates the application of the clamping forces of one form of a prior art film clamp.
Figure 2:
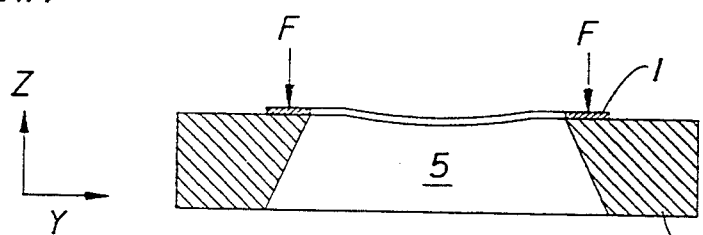
FIG. 2 is a cross section view of the free body diagram of FIG. 1 depicting the direction of the forces applied.
Figure 3:
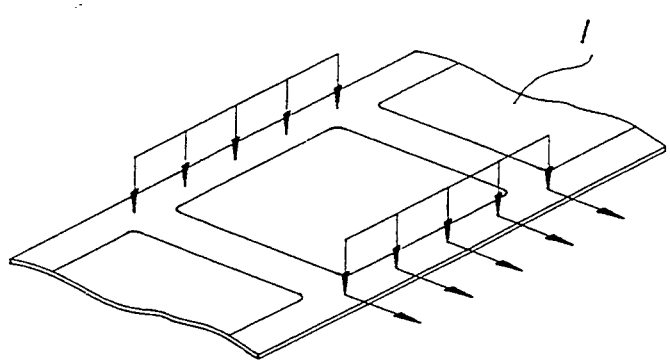
FIG. 3 is a free body diagram which illustrates the application of the clamping forces of a further form of a prior art film clamp.
Figure 4:
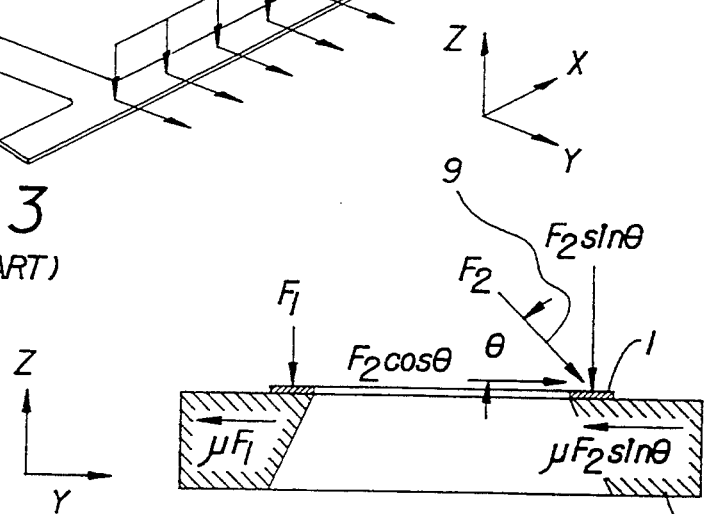
FIG. 4 is a cross section view of the free body diagram of FIG. 3 depicting the direction of the forces applied.
Figure 5:
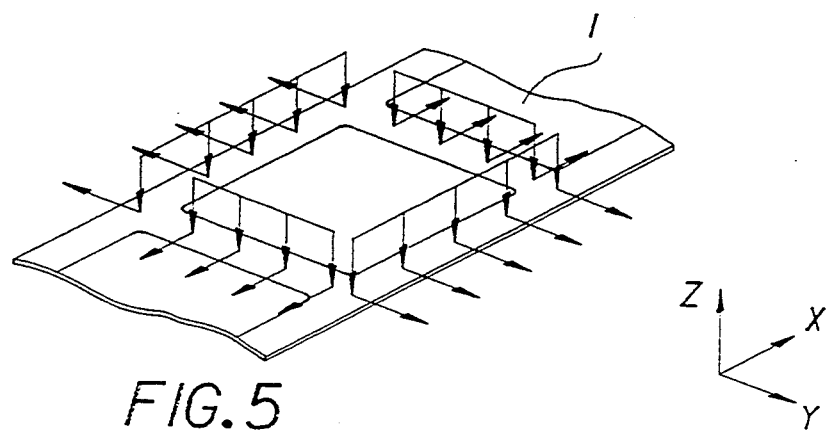
FIG. 5 is a free body diagram which illustrates the application of the clamping forces of a still further form of a prior art film clamp.
Figure 6:
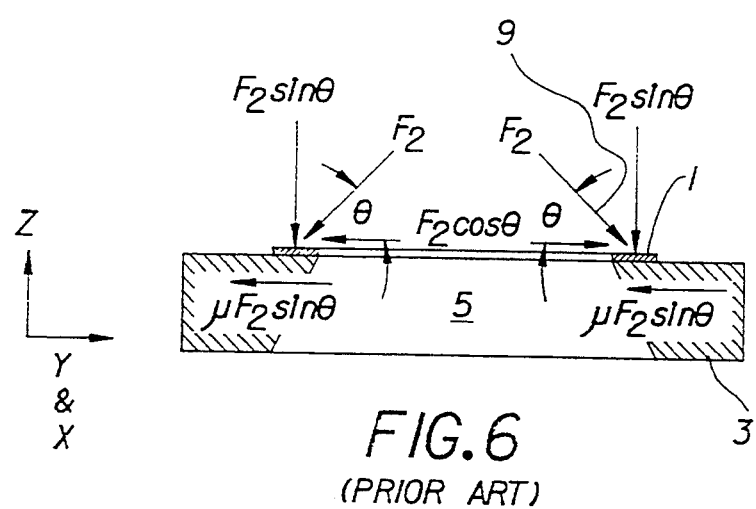
FIG. 6 is a cross section view of the free body diagram of FIG. 5 depicting the direction of the forces applied.
Figure 7:
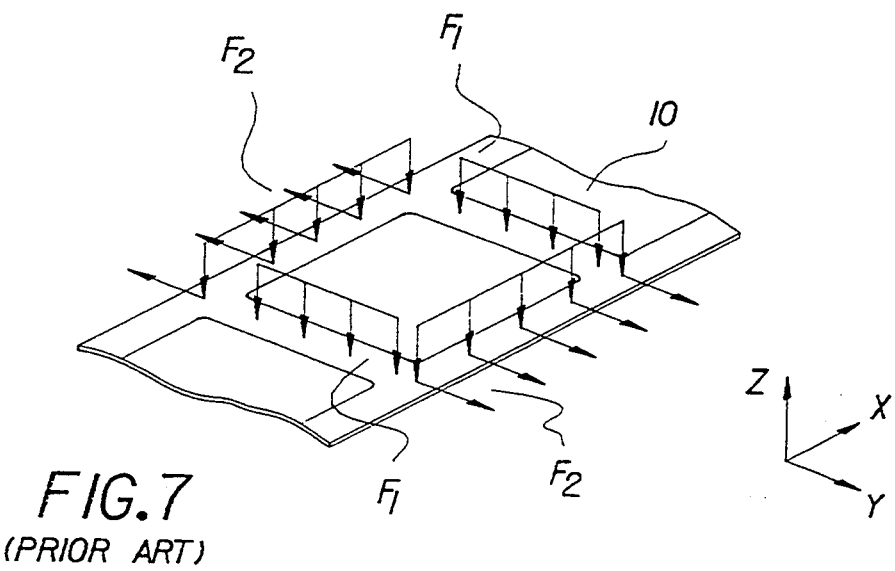
FIG. 7 is a free body diagram which illustrates the application of the clamping forces of the film clamp of the present invention.

Turning now to the drawings depicting the construction and operation of the film clamp of the present invention and a preferred embodiment thereof, FIG. 7 is a free body diagram which illustrates the distribution and direction of forces applied to the edges of a filmstrip image frame 10. Normal forces $F_1$ are distributed linearly against the lateral edges of the filmstrip image frame. The normal compression and laterally directed tensioning forces collectively identified as $F_2$ correspond to those forces depicted in FIG. 6 and are distributed linearly against the longitudinal edges of the image frame 10.

In accordance with the present invention, the forces depicted in FIGS. 7 and 6 are applied by operation of the film clamp 12 depicted in the remaining FIGS. 8–12. The filmstrip 10 is preferably transported to the scanning gate of the film clamp 12 through a film transport mechanism (not shown) which directs the leading end thereof in the direction of the arrows 14 into a slot 16 in frame 18 below the lower surface of aperture base or platen 20 in the retracted position of the film clamp 12. The film transport mechanism includes an image frame detector mechanism of a known type that halts transport when the image frame is centered with respect to the aperture 22 of the base 20. When so positioned, the lateral and longitudinal edges of the aperture 22 are aligned with respective lateral and longitudinal borders of the image frame of the filmstrip 10 to allow scanning of the entire image. Thus, the lower surface of the base 20 provides lateral and longitudinal opening edge surfaces adjacent the respective aperture edges that the filmstrip image frame edges may be compressed against in the contact position of the film clamp.

A drive motor assembly 30 is mounted in relation to the frame 18 and includes a drive motor 31 and a drive pulley 32 driven by way of the drive belt 34 extending around the obscured drive motor shaft and pulley. The drive motor 31 is operated on command of an electronic control unit (not shown) also receiving signals from the image frame detector and film transport mechanism to drive the pulley 32 through a portion of a rotation thereof to thereby move the dynamic portion of film clamp 12 (in a manner to be described) and flatten the filmstrip 10 image frame. The dynamic components of the film clamp 12 apply clamping forces to the filmstrip image frame borders as drive motor 31 stalls, by design, during film scanning. The drive motor 31 reverses direction and rotates the pulley 32 back to its starting position and move the dynamic components back to the retracted position thereby releasing the filmstrip image frame and allowing advancement of the filmstrip 10 to the next image frame. The drive motor may be a brush commutated, DC, permanent magnet, filed gear motor and may be operated under the control of a current limited drive circuit.

The platen 20 is fitted within a seat in the upper surface of frame 18 and retained there on one side by a quick release locking knob 36 and position seating spring 38 and on the other side by spring loaded retainers 40 and 42. The springs 44, 46 of spring loaded retainers 40, 42, respectively, resist any unseating force transmitted to the base 20 by operation of the film contacting clamping elements described hereafter.

The base 20 is readily removed from its seat in frame 18 by unscrewing knob 36 from the housing 18 and lifting it from contact with position seating spring 38 while slipping its notched side edge from beneath the spring loaded retainers 40, 42. After cleaning or replacement, the base 20 may be re-seated in its seat in the housing 18 in reverse order.

The base 20 and the frame 18 form a static or passive portion of the film clamp 12 against which the dynamic portion applies force in the pattern of FIG. 7. Turning to FIG. 9, it depicts the film clamp 12 of FIG. 8 with the static portion removed for ease of viewing the lifter assembly 50 and the carrier 60 as well as the other components of the dynamic portion of the film clamp 12.

The lifter assembly 50 includes a pair of lifting arms 52 (only one of which can be seen) each having a free end cam surface 54 which is urged by eccentric cams or lifters 56 to ride against the lower surface 62 of carrier 60. The lifting arms 52 are commonly attached to an axle 53 which is mounted to frame 18 through bearings 58 in each lateral side of frame 18, as shown in one instance in FIG. 8. Eccentric lifters 56 are coupled together on a common axle 57 with the pulley 32, and the axle 57 is supported at each end by bearings (not shown) in the lateral sides of frame 18. As the drive motor 31 rotates the axle 57, each eccentric lifter 56 rotates against a lower surface of each respective lifting arm 52 to lift or lower the arms 52 and the carrier 60. As described in reference to FIG. 10, the carrier 60 is biased to oppose the upward movement by the lifter assembly 50.

The carrier 60 is of a generally rectangular hollow shape having laterally extending sides which provide support and points of attachment for the support posts and biasing springs for the laterally extending clamping elements 72 and 74 as well as the pivoting support arms for the longitudinally extending clamping elements 82 and 84. In this regard, the support arms 86 and 88 are U-shaped and have longitudinally extending portions which provide longitudinal support for the longitudinally extending clamping elements 82 and 84 and laterally extending portions which extend to the center points of the lateral sides of the carrier 60 and are pivotally attached thereto to axles riding in bearings 90 and 92.

Figure 8:
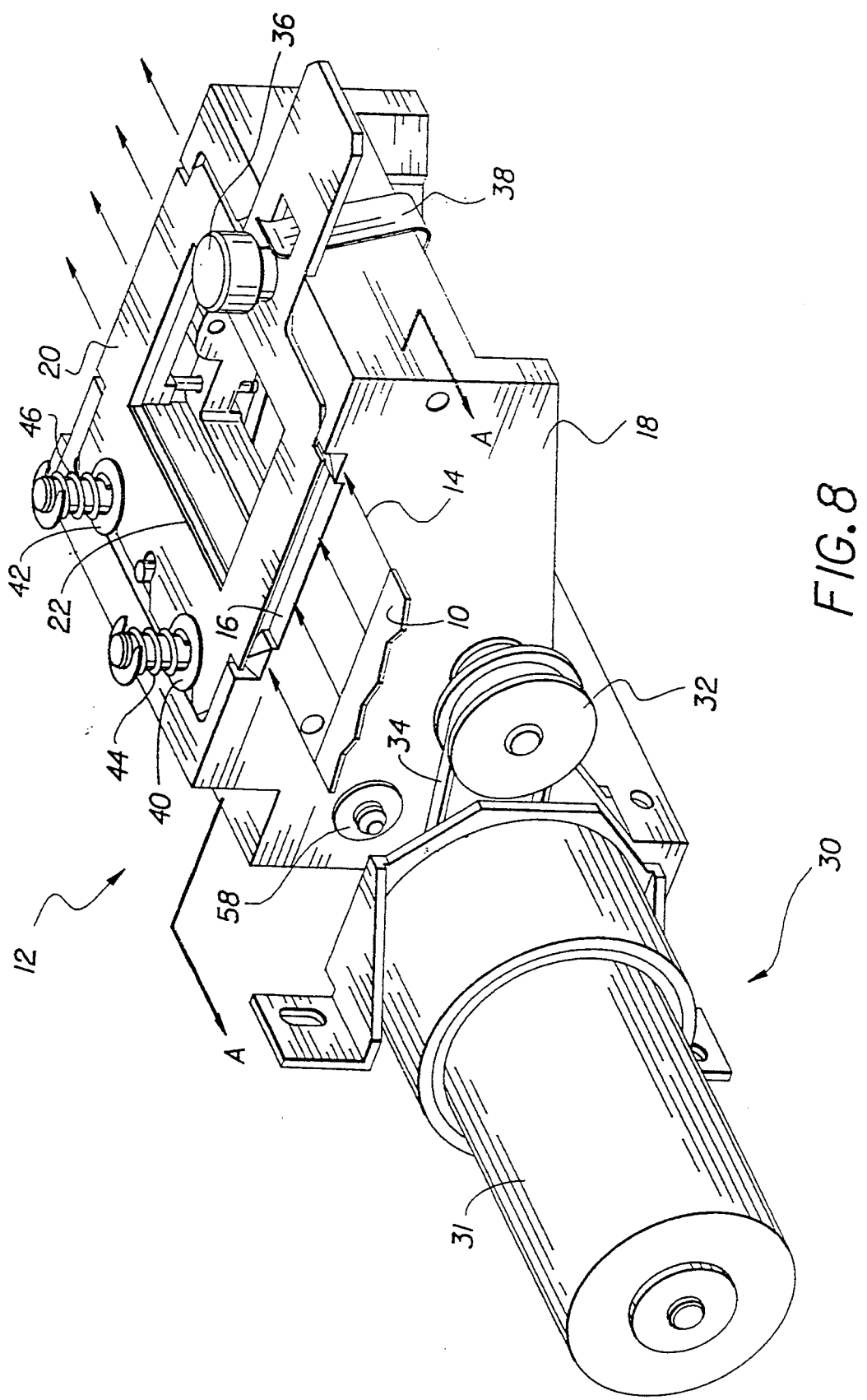
FIG. 8 is a perspective view of the preferred embodiment of the film clamp of the present invention.
Figure 9:
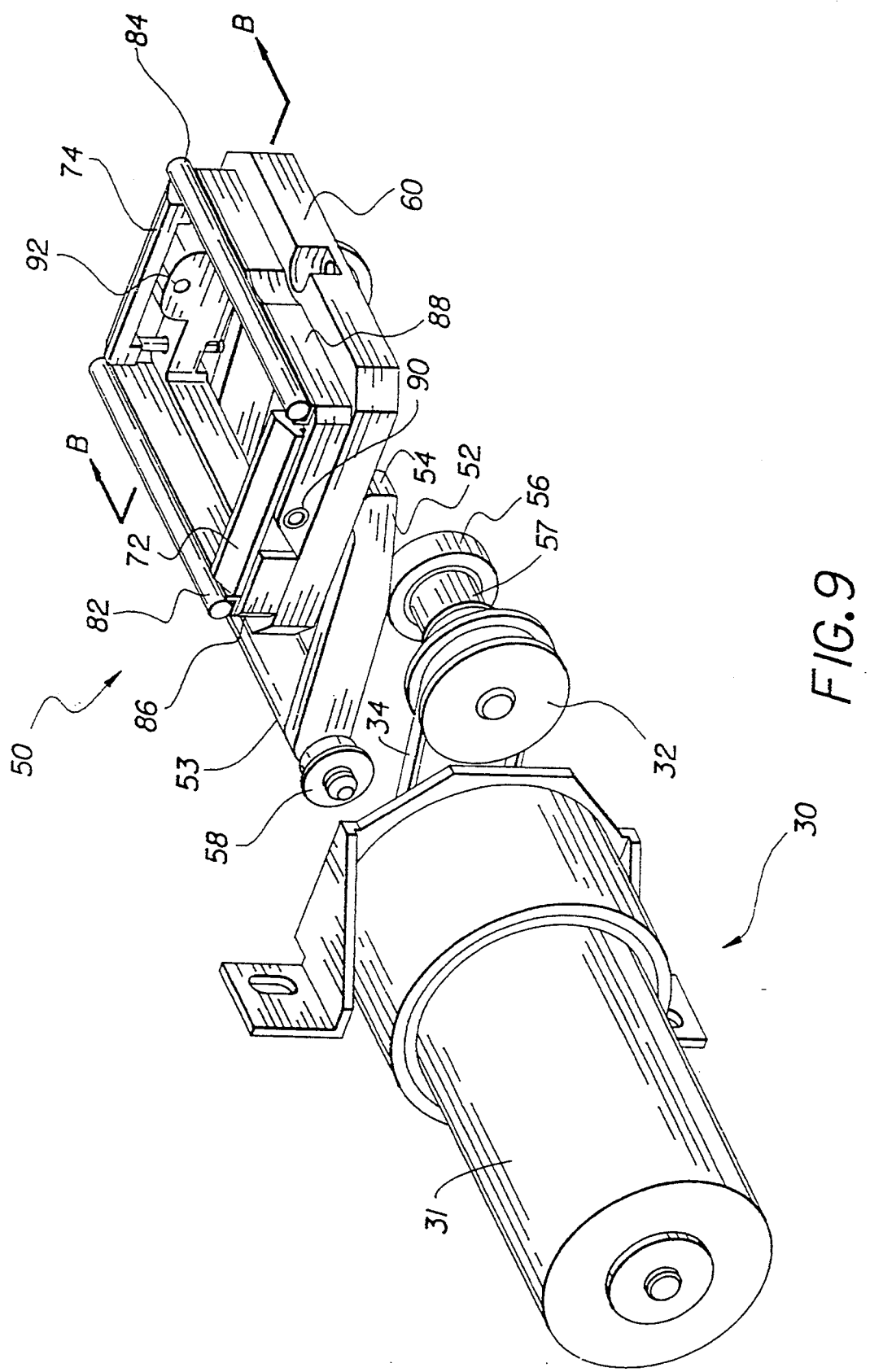
FIG. 9 is a further perspective view of the film clamp of FIG. 8 with the frame and aperture base or platen removed to reveal the clamping elements, the carrier and the eccentric lifter coupled to the drive motor.
Figure 10:
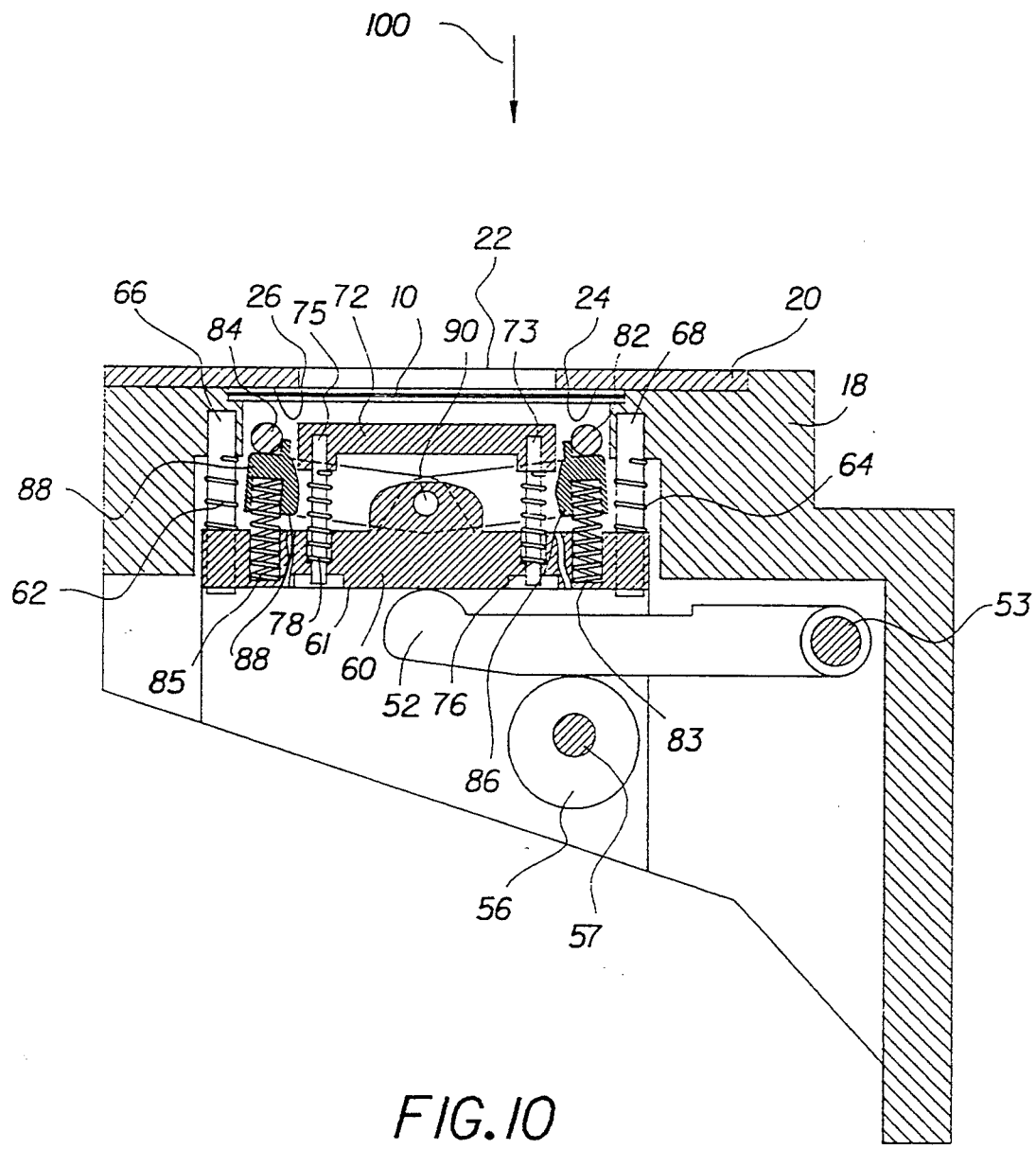
FIG. 10 is a side elevation, cross section view along lines A—A of FIG. 8 depicting the supporting and biasing components for the carrier and clamping elements for movement within the frame.

Turning to FIG. 10, it depicts the biasing springs and support posts as well as the pivotal attachment of the support arms 86 and 88, the support and guidance for the carrier 60 by the frame 18, and the biasing springs and support posts for the laterally extending clamping elements 72, 74 in a cross section view of FIG. 8. In this view, the carrier 60 is in the lower, retracted position, base 20 is seated in the upper surface of frame 18, and a filmstrip 10 extends longitudinally through the gap between the clamping elements and the base 20. The longitudinal edges of the filmstrip 10 are aligned with the longitudinal edge surfaces 24, 26 of the lower surface of the base 20. One of the lifting arms 52, pivotally supported by axle 53 and bearing 58, rests on an eccentric lifter 56 and bears against the lower surface of carrier 60. The carrier 60 is supported at each corner thereof by posts and springs, of which posts 66 and 68 and springs 62 and 64 are shown in FIG. 10. The posts 66, 68 and biasing springs 62, 64 extend downward from bore holes in the frame 18, and the posts, 66, 68 extend through bore holes in the carrier 60. Thus, as lifting force is imparted to the carrier 60 by the lifter assembly 50, it rises on the posts 66, 68 against the springs 62, 64. The carrier 60 falls back to the retracted position when the lifting arms 52 drop to their lowest position shown in FIG. 10.

Figure 11:
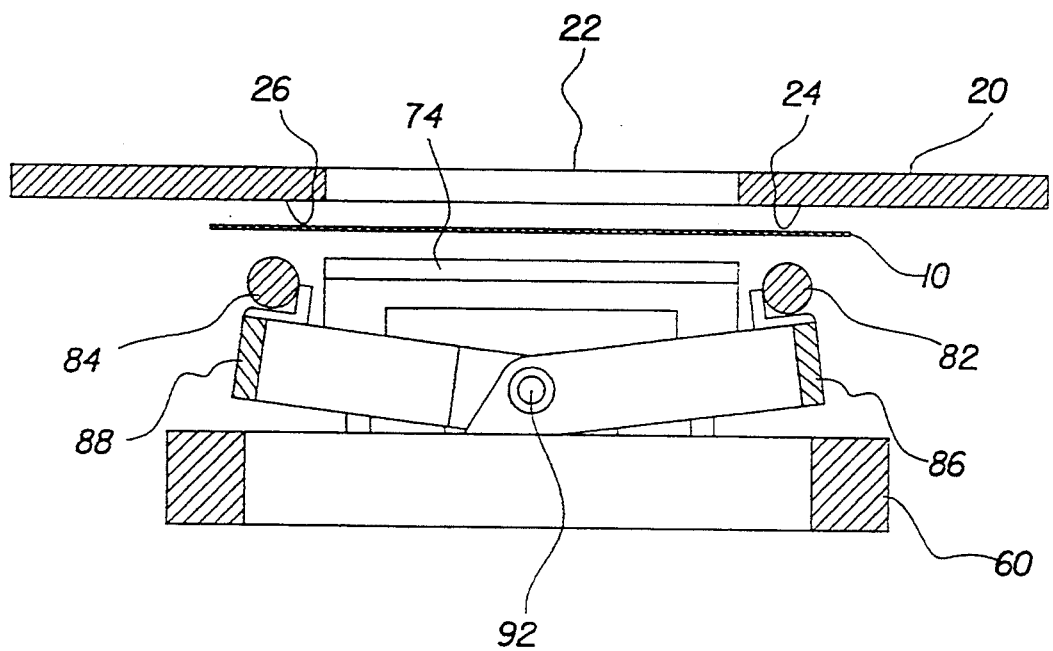
FIG. 11 is a simplified side elevation, cross section view along lines B—B of FIG. 9 of the film clamp in the retracted, unclamped position with respect to a filmstrip and base aperture.
Figure 12:
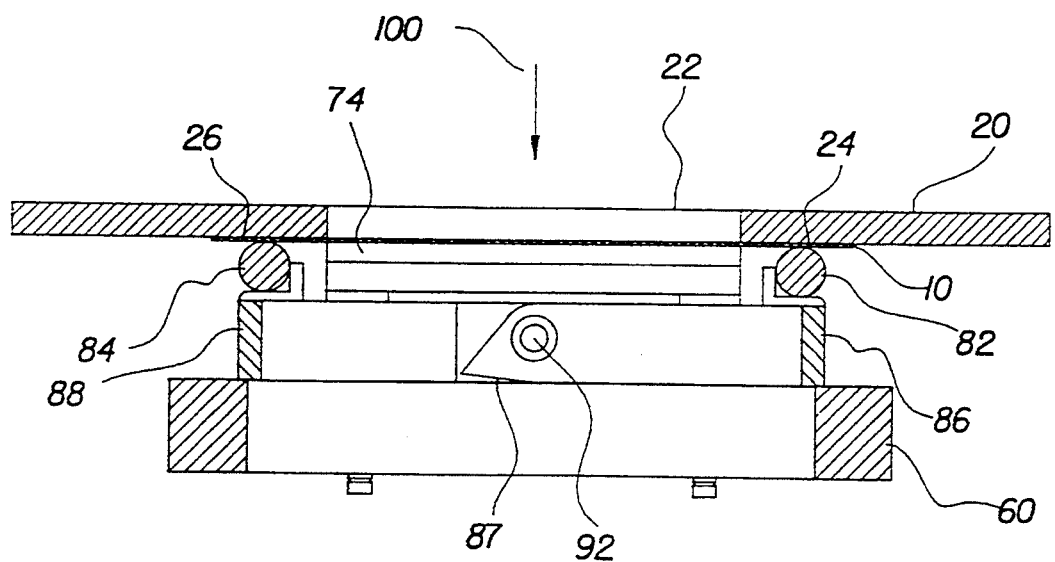
FIG. 12 is a simplified side elevation, cross section view along lines B—B of FIG. 9 of the film clamp in the clamped, contact position with respect to the filmstrip and base aperture.

The support arms 86, 88 for the longitudinally extending clamping elements 82, 84 are pivotally attached at their free ends, as at bearing 90 depicted in FIG. 10 and bearing 92 depicted in FIGS. 11 and 12. The supporting arms 86, 88 are biased away from carrier 60 by coil springs at each corner thereof, as by coil springs 83 and 85 depicted in FIG. 10. The ends of the U-shaped supporting arms 86, 88 are cut on a bias as better shown at bias cut 87 in FIGS. 11 and 12. The bias cut 87 in each end of supporting arms 86, 88 both allows and limits the pivotal movement upward of the supporting arms 86, 88 under the bias force imparted by the springs at each corner, e.g. bias springs 83, 85. The bias springs 83, 85 are captured in four sets of aligned bores in the carrier 60 and the supporting arms 82, 84 as depicted in FIG. 10.

As the longitudinally extending clamping elements 82, 84 are moved into contact with the longitudinal edges of the image frame of the filmstrip 10, the edges are pressed against the longitudinal edge surfaces 24, 26 of the aperture 22 in the base or platen 20. Continued upward movement of the carrier 60 causes the U-shaped supporting arms 86, 88 to pivot against the biasing springs 83, 85 and to move laterally outward from the bearings 90, 92. Thus, initially, force is applied normally to compress the longitudinal edges of the image frame of filmstrip 10, and with continued upward movement, the force is applied laterally to place the filmstrip under tension transversely as the sides of the supporting arms 86, 88 move outward. The laterally applied tensioning force is transferred to the filmstrip 10 by the friction contact of the surfaces of the longitudinally extending clamping elements 82, 84 with the filmstrip 10.

At the same time, compression force is applied to the transverse edges of the image frame of the filmstrip 10. As shown in FIG. 10, the transversely or laterally extending clamping elements 72, 74 are supported at each end by posts and coil springs, e.g. posts 73, 75 and coil springs 76, 78 supporting clamping element 72 as shown in FIG. 10. The posts 73, 75 are fixedly attached to bores in the ends of the clamping element 72 and slidably received in the aligned bores in the carrier 60. The coil springs bias the clamping elements upward and are compressed as the carrier 60 moves the transversely extending clamping elements 72, 74 into contact with the transverse edges of the image frame of the filmstrip 10. Thus the transversely extending clamping elements move upward and downward only, and, when moved upward, apply a normal, compression force to compress the lateral edge of the image frame of the filmstrip 10 against the lateral edge surfaces of the aperture 22 in the base 20.

The movement of the carrier 60 and the longitudinally and laterally extending clamping elements 82, 84 and 72, 74 from the retracted to the contact positions is depicted in FIGS. 11 and 12, which are simplified end views of the carrier 60 and clamping element assembly in relation to the filmstrip 10 and platen 20 taken along line B—B in FIG. 9. The lateral movement of the centrally pivoted longitudinally extending clamping elements is shown in FIG. 12 imparting tensioning forces transversely to the filmstrip 10 to flatten it under tension as the rod shaped clamping elements 82, 84 move apart on contact with the longitudinally extending edges of the filmstrip 10.

Preferably, the longitudinally extending clamping elements 82, 84 are formed of compressible rods, e.g. urethane, neoprene or silicon rubber O-ring seal materials, having relatively high coefficient of friction surfaces which frictionally engage with the edge surfaces of the filmstrip 10 to apply tension force laterally. The circular rods are cemented to the L-shaped channels on the upper surfaces of the longitudinally extending portions of the supporting arms 86, 88 depicted in FIGS. 10-12. The laterally extending clamping elements 72, 74 are preferably formed of low coefficient of friction plastic or polished ferrous material and are shaped with the sloped edge depicted in FIGS. 9 and 10 to encourage the leading end of a transversely curled filmstrip to enter the gap 16.

It should be noted that in the preferred embodiment described, the contact of the laterally and longitudinally extending clamping elements with the filmstrip takes place at the same time during the upward movement of the carrier 60. The sequence of contact may be altered so that the laterally extending clamping elements make contact at a later point during the lateral tensioning of the filmstrip by the transverse movement of the longitudinally extending clamping elements. The laterally extending clamping elements may also be positioned in the retracted position lower than the longitudinally extending clamping elements so as to provide greater clearance for feeding severely curled filmstrip leading ends into the gap 16.

Scanning of the clamped image frame of the filmstrip 10 is effected in the direction of the arrow 100 through the aperture 22, filmstrip 10 image frame, the hollow carrier 60 and the hollow frame 18 when the carrier 60 is moved to the contact position of FIG. 12. Scanning is conducted employing a linear light source and three color filtered CCD linear arrays to line scan the image as the entire film clamp assembly 12 is moved line by line in the longitudinal direction by a scanner transport mechanism (not shown) in a manner known in the art.

Although the film clamp of the present invention has been described in the context of a film scanner, it will be appreciated that it or its techniques and features may be employed in film clamps for other applications, e.g. in high speed photographic printers for making prints from negative filmstrips.

While there has been shown what are considered to be the preferred embodiments of the invention, it will be manifest that many changes and modifications may be made therein without departing from the essential spirit of the invention. It is intended, therefore, in the following claims to cover all such changes and modifications as may fall within the true scope of the invention.

PARTS LIST filmstrip 1
base 3
aperture 5
force pattern 7
force vector 9
filmstrip 10
film clamp 12
frame 14
filmstrip transport gap 16
frame 18
platen or base 20
aperture 22
longitudinal edge surfaces 24, 26
drive motor assembly 30
drive motor 31
drive pulley 32
drive belt 34
locking knob 36
position seating spring 38
spring loaded retainers 40, 42
springs 44, 46
lifter assembly 50
lifting arms 52
axle 53
free end cam surface 54
eccentric lifters 56
axle 57
bearings 58
carrier 60
lower carrier surface 61
biasing springs 62, 64
posts, 66, 68 laterally extending clamping elements 72, 74
posts 73, 75
coil springs 76, 78
longitudinally extending clamping elements 82, 84
coil springs 83 and 85
U-shaped supporting arms 86, 88
bias cut 87
bearings 90, 92
scanning direction arrow 100

We claim:

1. Filmstrip flattening apparatus operable in a contact position for clamping and flattening a filmstrip image frame with respect to a fixed image frame aperture and in a retracted position for unclamping and allowing transport of filmstrips evidencing transversely extending film curl past said fixed image frame aperture by a filmstrip transport mechanism, said apparatus comprising:

a base having said fixed image frame aperture formed therein, said fixed image frame aperture bounded by a pairs of transverse and longitudinal opening edges spaced apart to allow scanning of said filmstrip image frame therethrough, said base having transverse and longitudinal edge surfaces adjacent the respective aperture opening edges that the filmstrip image frame transverse and longitudinal edges bordering an image frame may be compressed against and laterally tensioned in said contact position;

clamping means operable in a retracted position defining a transport gap with said base for allowing transport of said filmstrip past said base and operable in a contact position when transport is halted for applying clamping force normally and laterally along both of said image frame longitudinal edges to flatten and to laterally tension said image frame against said longitudinal edge surfaces and for applying clamping force normally along both of the filmstrip image frame transverse edges to flatten the filmstrip image frame against said transverse edge surfaces, said clamping means further comprising:

a movable carrier positioned spaced apart from said base for movement from said retracted position and said contact position;

a first pair of longitudinally extending clamping elements;

first support means coupled to said carrier and to said first pair of longitudinally extending clamping elements for supporting said longitudinally extending clamping elements and spacing said longitudinally extending clamping elements apart from said carrier and equidistantly from said base in said retracted position defining said transport gap, said first support means transferring normal clamping force to said image frame longitudinal edges by normal movement of both of said longitudinally extending clamping elements against said image frame longitudinal edges by said first support means during movement of said carrier to said contact position and transferring lateral tension to both of said image frame longitudinal edges during movement of both of said longitudinally extending clamping elements transversely away from one another during completion of movement of said carrier from said retracted position to said contact position;

a second pair of transversely extending clamping elements; and second support means coupled to said carrier and said second pair of transversely extending clamping elements for supporting said second pair of transversely extending clamping elements in parallel with one another and for spacing said transversely extending clamping elements apart from said carrier and equidistantly from said base in said retracted position defining said transport gap, said second support means transferring normal clamping force through normal movement of both of said longitudinally extending clamping elements against said image frame longitudinal edges by said first support means during movement of said carrier from said retracted position to said contact position thereby applying clamping force normally along both image frame transverse edges during such movement; and means for moving said carrier between said retracted position and said contact position.

2. The apparatus of claim 1 further comprising: means formed in said transversely extending clamping elements for providing guidance for the leading end of a filmstrip transversely curled toward said transversely extending clamping elements during transport of the filmstrip across said image frame aperture by said transport mechanism when said clamping means is in its retracted position.

3. The apparatus of claim 1 wherein said longitudinally extending clamping elements further comprise elongated, rod shaped elements each formed of compliant material and having a high coefficient of friction surface for frictional engagement with said filmstrip image frame longitudinal edges for transferring lateral tensioning forces thereto.

4. The apparatus of claim 1 further comprising:

a frame for supporting said moving means and said clamping means with respect to said base in said retracted and said contact positions; and means for removably supporting said base with respect to said frame for allowing removal and cleaning of said aperture thereof.

5. The apparatus of claim 1 wherein:

said first and second support means are coupled with respect to said movable carrier for supporting contact of said longitudinally and laterally extending clamping elements with the filmstrip image frame edges upon movement of said carrier into said contact position, whereby the longitudinal and transverse image frame edges are flattened against said longitudinal and transverse edge surfaces, respectively, by initial compressive contact with said longitudinally and transversely extending clamping elements, and the longitudinal edges of the filmstrip are laterally tensioned by lateral extension apart of said longitudinally extending clamping elements through completion of movement of said movable carrier into said contact position.

6. The apparatus of claim 1 wherein said first support means further comprise:

first and second support arm means for each supporting one of said pair of longitudinally extending clamping elements at a free end thereof for movement with respect to said carrier, said first and second support arm means each pivotally attached at at an attached end thereof to said movable carrier for providing normal and lateral movement to said longitudinally extending clamping elements with respect to said carrier and said fixed base during movement of said carrier into said contact position; and first and second biasing means for each biasing said longitudinally extending clamping elements at said free ends of said first and second support arm means away from said carrier to extend toward said base to provide normal contact to said filmstrip longitudinal edges on initial contact therewith upon operation of said moving means and for allowing lateral movement of said longitudinally extending clamping elements during completion of the movement of said carrier to said contact position.

7. The apparatus of claim 6 wherein said first and second biasing means further each comprise compression springs seated between said first and second support arm means and said carrier for providing biasing force for extending said support arm means free ends toward said base and away from said carrier and for compressing on contact of said longitudinally extending clamping elements at said free ends of said first and second support arm means with said image frame longitudinal edges for applying a controlled compression and lateral tensioning force thereto.

8. The apparatus of claim 7 wherein said second support means further comprise compression springs seated between said transversely extending clamping elements and said carrier for providing biasing force for extending said transversely extending clamping elements toward said base and away from said carrier and for compressing on contact of said transversely extending clamping elements against said image frame longitudinal edges for applying a controlled compression force thereto.

9. The apparatus of claim 6 wherein said second support means further comprise compression springs seated between said transversely extending clamping elements and said carrier for providing biasing force for extending said transversely extending clamping elements toward said base and away from said carrier and for compressing on contact of said transversely extending clamping elements against said image frame longitudinal edges for applying a controlled compression force thereto.

10. The apparatus of claim 6 wherein said longitudinally extending clamping elements further comprise elongated rod shaped elements formed of compliant material having a high coefficient of friction surfaces for frictional engagement with said filmstrip image frame longitudinal edges for transferring lateral tensioning forces thereto.

11. A method of clamping the longitudinal and transverse edges of a filmstrip image frame with respect to a fixed aperture of a stationary base, said fixed aperture defined by longitudinal and transverse opening edges formed in a surface of said stationary base and spaced apart to allow scanning of the filmstrip image frame therethrough, in a flattening mode when filmstrip transport is halted, and, in a transport mode, of unclamping and allowing transport of the filmstrip past the fixed aperture through a transport gap by a filmstrip transport mechanism, said method comprising the steps of:

pivotally mounting and supporting a pair of spaced apart, longitudinally extending, clamping elements with respect to a movable carrier on the free ends of a respective pair of support arms in a retracted position extending toward, while spaced apart from, said base surface and forming said transport gap through which said filmstrips are transported longitudinally in said transport mode by said transport mechanism;

supporting a pair of spaced apart, transversely extending clamping elements with respect to said movable carrier in a retracted position spaced apart from said surface of said stationary base sufficiently to avoid contact with said filmstrips transported longitudinally in said transport mode by said transport mechanism;

in said transport mode, operating said transport mechanism to advance said filmstrip image frames longitudinally through said transport gap in relation to said fixed aperture; and, in said flattening mode, moving said carrier and said longitudinally and transversely extending clamping elements from said retracted position into said transport gap and into a contact position with the longitudinal and transverse edges of said image frame, and in the course of such movement into the contact position:

applying normal compressing force through the longitudinally extending clamping elements to compress the longitudinal edges of said filmstrip image frame against said surface of said stationary base;

applying laterally directed tensioning force through the longitudinally extending clamping elements as said longitudinally extending clamping elements pivotally spread apart and move away from the longitudinal edges of said image frame to laterally tension the longitudinal edges of said filmstrip image frame apart; and applying normal compressing force through the transversely extending clamping elements to compress the transverse edges of said filmstrip image frame against said surface of said stationary base, whereby in said contact position said filmstrip image frame is flattened by normal compression force applied along the longitudinal and transverse edges of the filmstrip image frame and tensioned laterally by said laterally applied force as said longitudinally extending clamping elements are fully moved and spread apart transversely.

12. The method of claim 11 wherein said second supporting step further comprises:

supporting said transversely extending clamping elements in their respective retracted position in a nested relation with said longitudinally extending clamping elements such that said transversely extending clamping elements are positioned to extend between said longitudinally extending clamping elements.

13. Apparatus for clamping the longitudinal and transverse edges of a filmstrip image frame with respect to a fixed aperture of a stationary base, said fixed aperture defined by longitudinal and transverse opening edges formed in a surface of said stationary base, in a flattening mode when filmstrip transport is halted, and unclamping and allowing transport of the filmstrip past the fixed aperture in a transport path by a filmstrip transport mechanism in a transport mode, said apparatus comprising:

first and second pairs of spaced apart, longitudinally and transversely extending clamping elements, respectively;

a movable carrier;

means operable in said for moving said movable carrier from a retracted position to a contact position with respect to said base;

first supporting means for supporting said first pair of spaced apart, longitudinally extending, clamping elements for pivotal movement with respect to said movable carrier upon movement of said carrier into said contact position from said retracted position;

first biasing means for biasing said longitudinally extending clamping elements away from said movable carrier and toward, while spaced apart from, said surface of said stationary base and forming a transport path gap through which said filmstrips are transported longitudinally in said transport mode by said transport mechanism;

second supporting means for supporting said second pair of spaced apart, transversely extending clamping elements for normal movement with respect to said movable carriage upon movement of said carrier into said contact position from said retracted position;

second biasing means for biasing said transversely extending clamping elements toward, while spaced apart from, said surface of said stationary base, whereby said transport path gap is sufficient to avoid contact with said filmstrips transported longitudinally in said transport mode by said transport mechanism;

means operable in said flattening mode for moving said first pair of spaced apart, longitudinally extending, clamping elements from said retracted position into said gap and into a contact position for applying compression force on the longitudinal edges of said filmstrip image frame and against said surface of said stationary base and for applying tensioning force transversely across said image frame on the longitudinal edges of said filmstrip image frame and against said surface of said stationary base;

means operable in said flattening mode for moving said second pair of spaced apart, transversely extending, clamping elements from their retracted position into said gap and into a contact position for applying compression force on the transverse edges of said filmstrip image frame and against said surface of said stationary base, whereby said filmstrip image frame is flattened by tensioning and compression forces applied along said longitudinal and transverse edges of the filmstrip image frame as said clamping elements are advanced fully to their respective contact positions.

14. The apparatus of claim 13 wherein said second supporting means further comprises:

means for supporting said transversely extending clamping elements in their respective retracted position in a nested relation with said longitudinally extending clamping elements such that said transversely extending clamping elements are positioned to extend between said longitudinally extending clamping elements when moved to their contact positions.

* * * * *